US009575885B2

(12) United States Patent
Chen et al.

(10) Patent No.: US 9,575,885 B2
(45) Date of Patent: Feb. 21, 2017

(54) DATA STORAGE APPARATUS FOR SCRAMBLED DATA AND MANAGEMENT METHOD THEREOF

(71) Applicant: Silicon Motion, Inc., Jhubei, Hsinchu County (TW)

(72) Inventors: Chia-Hsin Chen, Taichung (TW); Kuo-Liang Yeh, Zhudong Township, Hsinchu County (TW); Ken-Fu Hsu, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 795 days.

(21) Appl. No.: 13/915,257

(22) Filed: Jun. 11, 2013

(65) Prior Publication Data

US 2014/0365710 A1 Dec. 11, 2014

(51) Int. Cl.
*G06F 12/02* (2006.01)
*G06F 12/14* (2006.01)

(52) U.S. Cl.
CPC ....... *G06F 12/0246* (2013.01); *G06F 12/1408* (2013.01)

(58) Field of Classification Search
CPC .......... G06F 12/0246; G06F 12/1408
See application file for complete search history.

(56) References Cited

U.S. PATENT DOCUMENTS

| 7,114,028 B1* | 9/2006 | Green | G06F 3/0605 369/59.25 |
| 7,120,735 B1* | 10/2006 | Summers | G06F 3/0605 369/59.25 |
| 7,702,984 B1* | 4/2010 | Lee | G06F 12/1416 365/185.33 |
| 7,788,553 B2* | 8/2010 | Chow | G06F 11/2221 365/185.33 |
| 2006/0164883 A1* | 7/2006 | Lablans | G11B 20/00086 365/185.03 |
| 2006/0294289 A1* | 12/2006 | Ashmore | G06F 21/78 711/100 |
| 2009/0113121 A1* | 4/2009 | Lee | G06F 12/0246 711/103 |

* cited by examiner

*Primary Examiner* — Arpan P. Savla
(74) *Attorney, Agent, or Firm* — McClure, Qualey & Rodack, LLP

(57) ABSTRACT

A data storage apparatus has a transmission interface, a nonvolatile memory and a controller. The controller records a non-completed flag. When the controller starts a card opening process, the nonvolatile memory is configured under card opening, and the non-completed flag is set non-completed status. When the controller receives a format command form the transmission interface, the nonvolatile memory is formatted and the non-completed flag is set as completed status. When the controller receives a write command, the write data are scrambled before being written to the nonvolatile memory. When in non-completed status, when the controller receives a read command from the transmission interface, no matter whether the data corresponding to the requested address are scrambled, the data are descrambled and descrambled are provided via the transmission interface.

18 Claims, 7 Drawing Sheets

| NC Flag | Valid Flag | LB | PB |
|---|---|---|---|
| 1 | 0 | 435 | 221 |
| 1 | 1 | 212 | 779 |
| 0 | 0 | 112 | 832 |
| 0 | 1 | 554 | 21 |

Fig. 6

DATA STORAGE APPARATUS FOR SCRAMBLED DATA AND MANAGEMENT METHOD THEREOF

FIELD OF INVENTION

The present invention relates to a data storage apparatus and a management method thereof, and more particularly relates to a data storage apparatus and a management method thereof, in which stored data are scrambled.

BACKGROUND

More and more devices use nonvolatile memory devices like flash memory. It is therefore more and more important to ensure data liability and security. During manufacturing a data storage apparatus, card opening is also involved. It is therefore critical to design a process to ensure data security and liability while supporting various encoding skills.

SUMMARY OF INVENTION

A major objective of the present invention is to provide a data storage apparatus having a transmission interface, a nonvolatile memory and a controller. The controller records a non-completed flag. When the controller receives a first initialization command via the transmission interface, the controller performs a first initialization setting to the nonvolatile memory and sets the non-completed flag as a non-completed status. When the controller receives a second initialization command via the transmission interface, the controller performs a second initialization setting to the nonvolatile memory and sets the non-completed flag as a completed status. When the controller receives a write command via the transmission interface, write data are scrambled and then the scrambled write data are written to the nonvolatile memory. When the non-completed flag indicates the non-completed status, if the controller receives a read command to the nonvolatile memory via the transmission interface, no matter whether data associated to an indicated address of the read command are scrambled, the controller descrambles the data associated to the indicated address and then provides the descrambled data associated to the indicated address via the transmission interface.

In an embodiment, the first initialization setting is a card open processing, and in the card open processing, the nonvolatile memory is not formatted.

In an embodiment, the second initialization setting is formatting and in the formatting, the controller formats the nonvolatile memory.

In an embodiment, when the data storage apparatus is connected to an external device, the external device tries to access data of at least one specific address of the data storage apparatus and find the data undefined, the external device issues the second initialization command.

In an embodiment, the card open processing is performed by a manufacturer of the data storage apparatus, and the formatting is performed when a user uses the data storage apparatus.

In an embodiment, the nonvolatile memory is a flash memory comprising a plurality of physical blocks, the controller records a mapping relation for mapping a plurality of logical blocks to the plurality of physical blocks.

In an embodiment, the controller further records whether the physical block associated with each logical block is valid.

In an embodiment, the controller records whether the physical block associated with each logical block is valid according to a valid flag.

In an embodiment, only when the non-completed flag indicates the completed status, the controller determines whether to return the descrambled data according to the valid flag.

In an embodiment, the descrambling adjusts electronic characteristics corresponding to data stored in the nonvolatile memory to increase reliability of data storage.

In an embodiment, the nonvolatile memory comprises a control circuit and a plurality of flash memory physical blocks, and the control circuit erases the flash memory physical block to correspond to an initial value when receiving an erase command from the controller.

Another objective of the present invention is to provide a method for managing a data storage apparatus.

BRIEF DESCRIPTION OF DRAWINGS

FIG. 6 illustrates relations between non-completed flags, valid flags and their relations to logical blocks and physical blocks.

DETAILED DESCRIPTION

Figure 1:
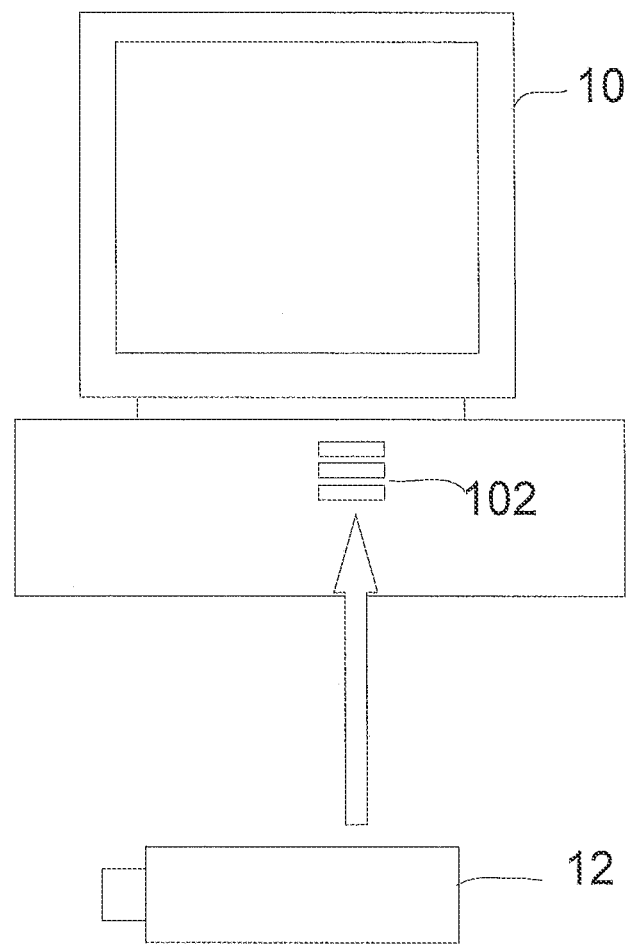
FIG. 1 illustrates use of a first embodiment according to the present invention.

Please refer to FIG. 1, which illustrates how a first embodiment is used according to the present invention.

A computer 10 has a USB transmission interface 102. The computer accesses data in a thumb drive 12 via the USB transmission interface 102. This example is only for explaining the concept of the invention, instead of limiting the scope of the invention. For example, the computer 10 may be replaced as any electronic devices like a mobile phone, a tablet computer, a television, a camera or any electronic devices that need a storage device. The thumb drive may be replaced as other storage device external to the computer 10 or any other storage device internal to the computer 10. The USB transmission interface 102 may be replaced as any data transmission interface, like IEEE 1394, SATA, MS interface, MMC interface, SD interface, CF interface, IDE interface, PCT interface, etc.

Taking thumb drives, external hard disk or internal hard disk as examples, when these data storage apparatuses are connected to a computer or similar electronic devices, the computer or other similar electronic devices may try to read the data in these data storage apparatuses to determine whether the data storage apparatuses are formatted. If these data storage apparatuses are not formatted, the computer or other similar electronic devices may ask a user whether to perform formatting for these data storage apparatuses. When the user decides to format these data storage apparatuses, the computer or other similar electronic apparatuses issue commands to these data storage apparatuses, and these data storage apparatuses start formatting themselves. Alternatively, the computer or other similar electronic devices provide detailed control instructions like creating file tables or writing default values that are necessary for formatting these data storage apparatuses.

Figure 2:
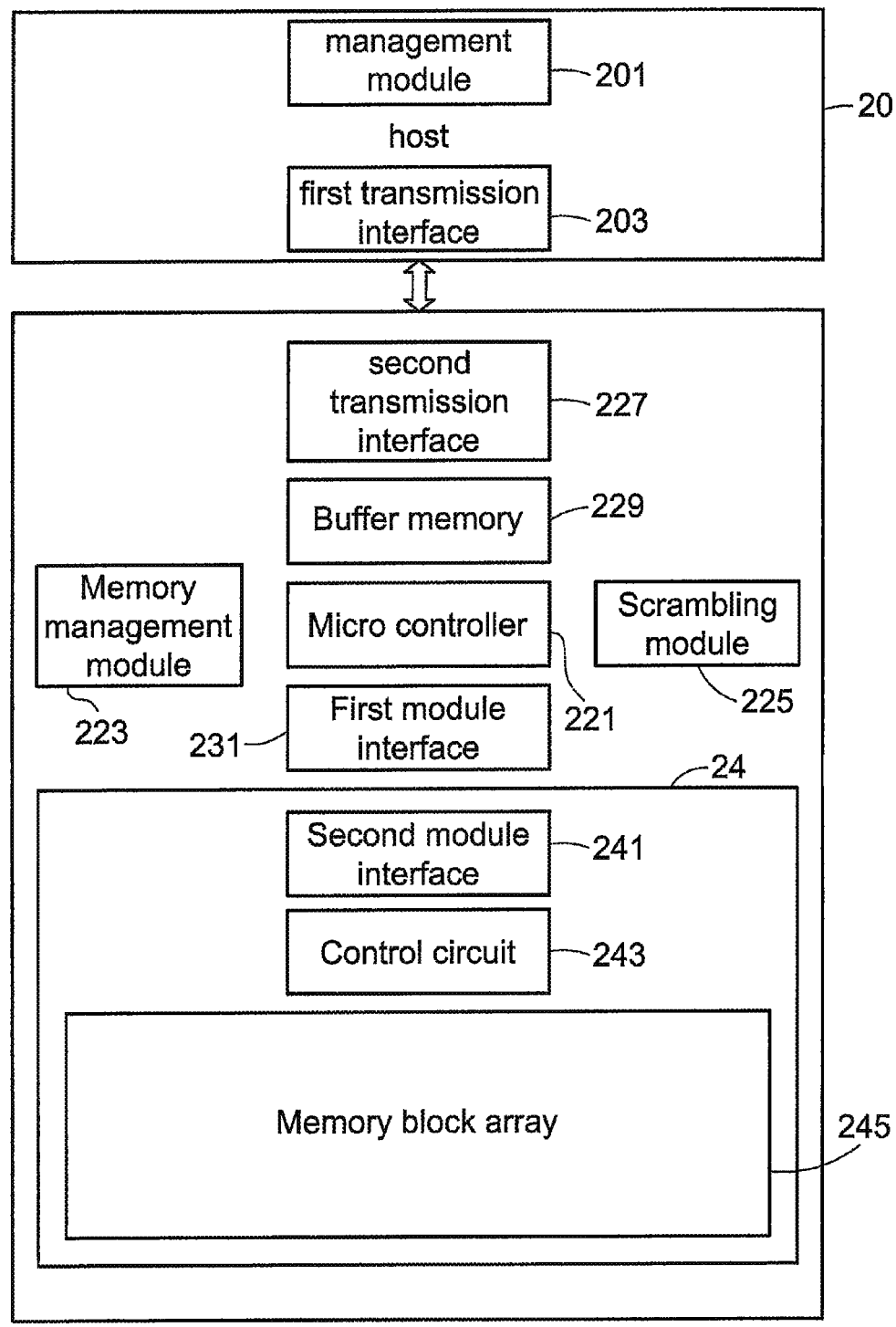
FIG. 2 illustrates an implementation diagram of the first embodiment according to the present invention.

Please refer to FIG. 2, which is a diagram illustrating an implementation of the devices of FIG. 1.

The host 20 has a management module 201 and a first transmission interface 203. The host 20, under certain hardware, software or their combination of the management module 201, accesses data stored in a data storage apparatus 22. The host 20 mentioned here may refer to the computer 10 in FIG. 1. The management module 201 may include examples of an operating system that runs on the host and handle files and data storage, corresponding drivers and control circuits, and their combination.

The data storage apparatus 22 has a second transmission interface 227, a micro controller 221, a buffer memory 229, a memory management module 223, a scrambling module 224 and a first module interface 231. The data storage apparatus 22 further has a memory module 24 and the memory module 24 has a second module interface 241, a control circuit 243 and a memory block array 245.

In this example, the second transmission interface 227 corresponds to the first transmission interface 203 of the host 20, for providing mechanical structures, electronic components and/or other corresponding signal handling. The buffer memory 229 is used as buffer for signal transmission during reading and writing of data or as part of a cache structure. The operation of the data storage apparatus 22 is mainly controlled by the micro controller 221 for executing predetermined instruction to generate associated control signals at correct timing for control operations of each component. The memory management module 223 and the scrambling module 225 may be implemented by hardware circuits, by hardware circuits accompanied with instructions executed by the micro controller 221 or by just corresponding instructions executed by the micro controller 221.

The first module interface 231 is used for communication with the memory module 24. The second module interface 241 corresponds to the first module interface 231. The control circuit 243 accesses the memory block array 245 according to commands from the micro controller 221. The memory block array 245 includes a plurality of flash memory physical blocks.

The memory management module 223 includes processing logic and mapping tables for recording and mapping the physical blocks of the memory block array to logical blocks. In addition, the data storage apparatus 22 may also include error correction module (not shown).

The scrambling module 225 performs scrambling encoding for original data that is requested to be written to the memory module 24 to generate scrambled data. The scrambling module 225 also descrambles scrambled data that are read from the memory module 24 to recover back to original data. Scrambling may be performed by switching bits in different positions, phase inverse for bits on certain positions, using different scrambling schemes for odd addresses and even addresses respectively, or by any other encoding/decoding schemes.

An objective of scrambling is to ensure liability of data storage. For example, if adjacent units store same values, e.g. both 0 or 1, in a flash memory, it is possible that stability of data storage is affected due to electronic interference. In other words, by scrambling encoding to interleaving 0 and 1 among adjacent units, liability of data storage is improved. Therefore, by providing scrambling encoding, flash memory of lower cost may be used while keeping certain storage quality.

Scrambling may be based on any other purposes, e.g. to prevent data being accessed by unauthorized users. Scrambling may also be implemented by any other known or developing encoding technologies if original data are able to be converted to another value and then recovered back to original data.

Figure 3:
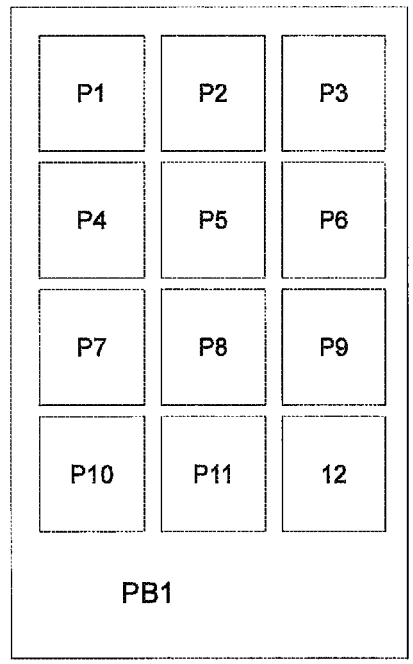
FIG. 3 illustrates relations of physical blocks and pages.
Figure 3:
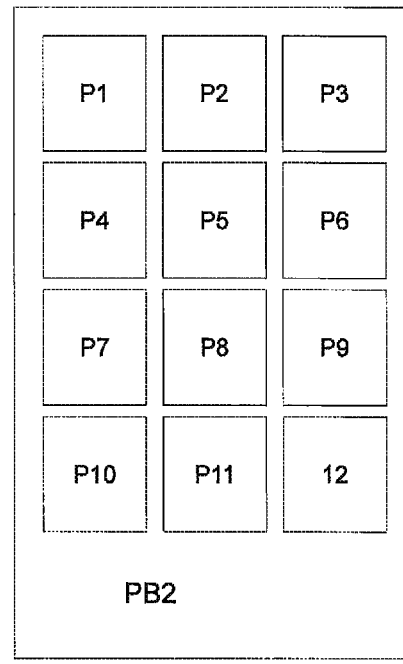
Figure 3:
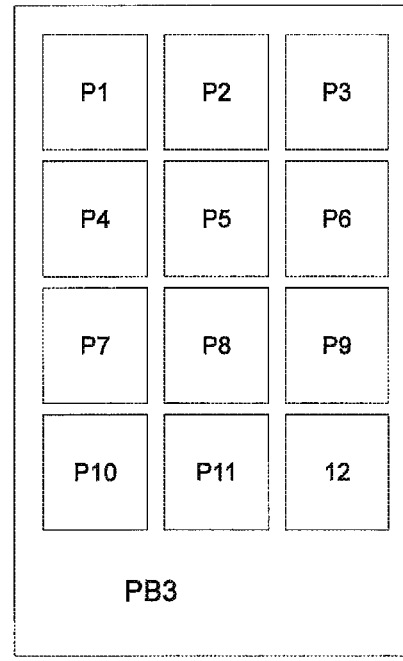
Figure 3:
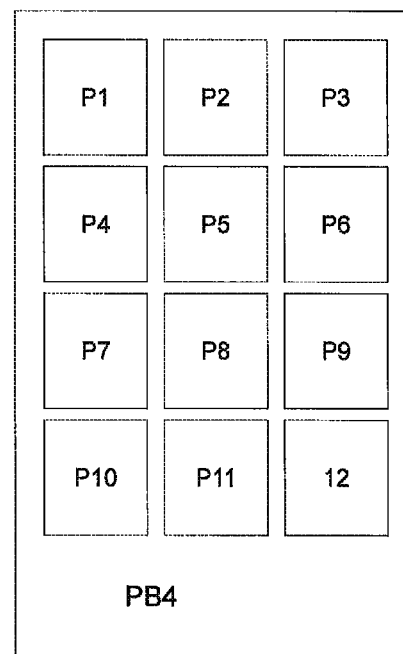

Please refer to FIG. 3, which illustrates relations between physical blocks and pages in a flash memory.

In FIG. 3, there are four physical blocks PB1, PB2, PB3 and PB4. Each physical block is further divided into a plurality of pages, P1, P2, P3, . . . P12. In this example, a physical page corresponds to 12 pages. In real design, the number of pages in a physical block may be different according to different design requirements. Further, in different application fields, physical blocks and pages may be referred in other terms. Or, the physical blocks and pages may be regrouped. Because these are known for persons skilled in the art, further details are not repeated here.

For flash memory like NAND flash memory or NOR flash memory, a physical block needs to be erased before any write operation performed on an unused physical block. Erase operation is taking a physical block as a basic unit while write operation is taking a page as a basic unit. Physical blocks, after being erased, may now be able to be written to any page thereon. However, if a page on a physical block has been written and a rewrite operation on the same page is to be performed, the physical block that contains the page needs to be erased again first.

Because the range of a physical block is larger than the range of a page, data need to be moved if aforementioned rewrite operation is to be performed on a page already being written. In other words, data with the same logical address may be moved from a physical block to another physical block during data read and data write processes.

Figure 4:
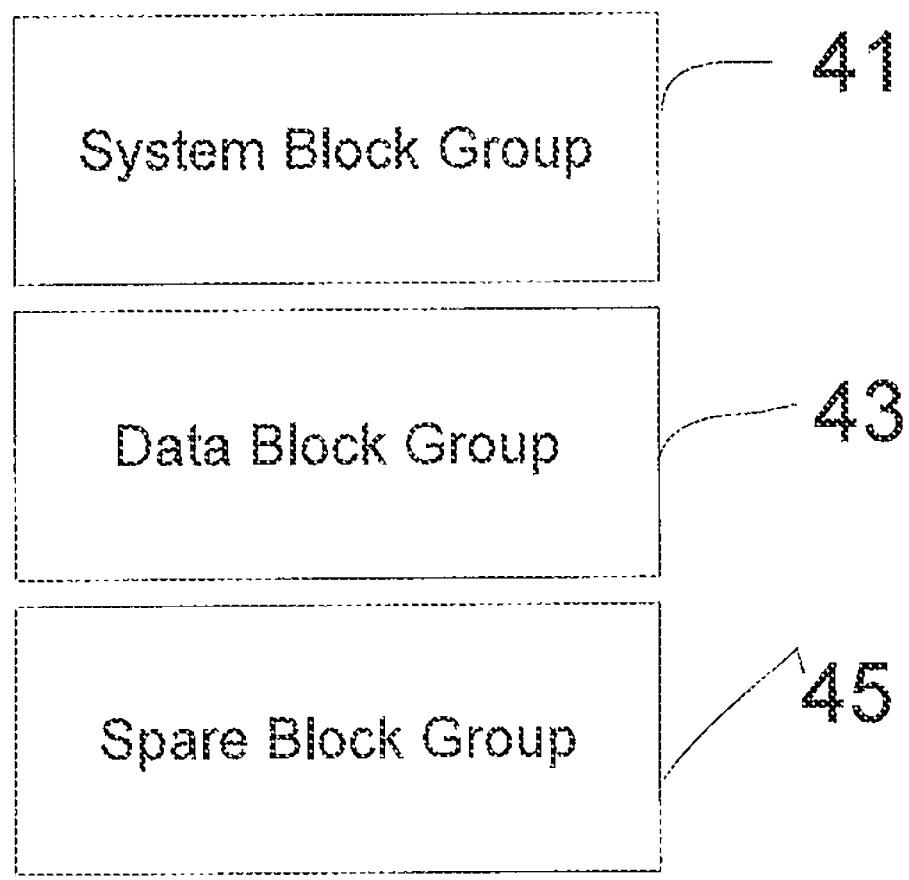
FIG. 4 illustrates that logical blocks are divided into three areas.

Next, please refer to FIG. 4, which illustrates a classification for physical blocks.

All physical blocks are divided into three types, system block group 41, data block group 43 and spare block group 45. The system block group 41 is used for storing mapping tables of logical blocks and physical blocks, instruction codes of micro controller, various flags and other system data. In addition to the system block group 41, the data block group 43 refers to physical blocks that are really used for storing data. Spare block group 45 refers to physical blocks that are used for data movement and spared purposes.

As mentioned above, when pages that are already written are to be rewrite, erase operation needs to be performed at first. In other words, data on other pages in the same physical block needs to be copied to another physical block, which is selected from the spare block group 45. When data are copied to the spare block group 45, the physical block is classified to the data block group 43, and the original physical block is erased and classified to the spare block group 45.

In other words, not only the mapping among physical blocks and logical addresses keeps changing, but also the mapping among physical blocks to which group. Therefore, the system needs to record the mapping among logical blocks and physical blocks.

Figure 5:
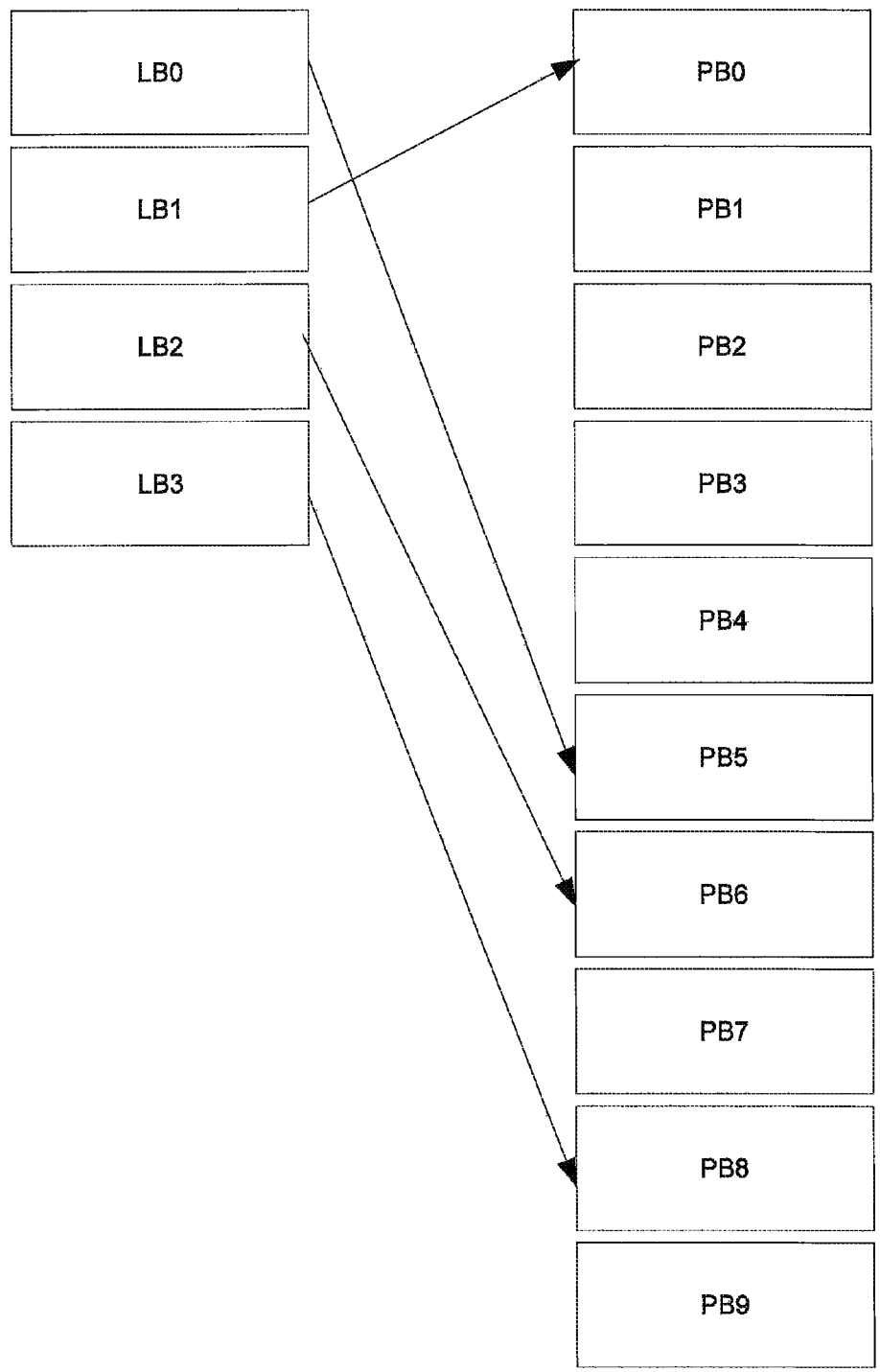
FIG. 5 illustrates a mapping relation between logical blocks and physical blocks.

Please refer to FIG. 5, which illustrates mapping among logical blocks and physical blocks. In this example, the logical block LB0 corresponds to the physical block PB5, the logical block LB1 corresponds to the physical block PB0, the logical block LB3 corresponds to the physical block PB6 and the logical block LB3 corresponds to the physical block PB9.

A data storage apparatus may use mapping table or other methods for storing such mappings.

FIG. 6 illustrates using a mapping table for recording relations among logical blocks and physical blocks. In the example of FIG. 6, the logical block LB 435 corresponds to the physical block PB 221, the logical block LB 212 corresponds to the physical block 779, the logical block 112 corresponds to the physical block 832 and the logical block 554 corresponds to the physical block 21.

In addition to record relations among logical blocks and physical blocks, the mapping table may also include non-completed flags and valid flags. The following description explains the setting and use of the non-completed flags and valid flags.

Figure 7:
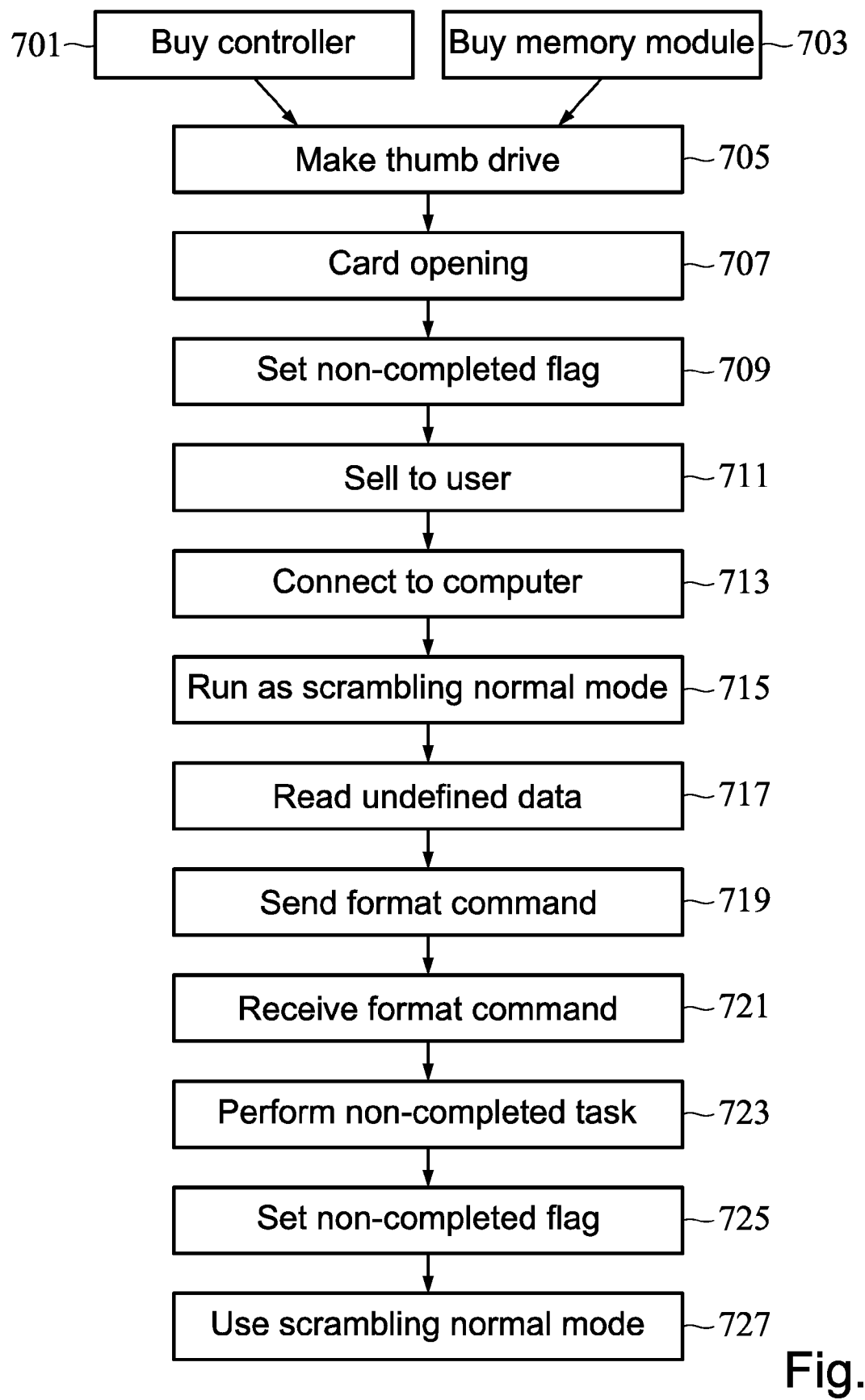
FIG. 7 is a flowchart illustrating how a thumb drive is made and used.

Please refer to FIG. 7, which explains how a thumb drive is produced.

First, a manufacturer buys a controller in chip or circuit forms (step 701) and a memory module like flash memory (step 703). The manufacturer installs the controller and the memory module on a circuit board, implementing the structure exemplified in FIG. 1 and FIG. 2 and add metal or plastic package to complete a basic thumb drive (step 705). The term for opening a card refers to that a manufacturer connects the thumb drive to a computer host or other card opening machines, the card opening machines issues one or more card opening commands to the controller in the thumb drive to complete first stage initialization. This step includes testing and counting how many of physical blocks may operate normally, recording good physical blocks and classify them into one of the system block group 41, the data block group 43 and the spare block group 45. In addition, the card opening procedure also creates the mapping relations among logical blocks and physical blocs as illustrated in FIG. 5 and the mapping table as illustrated in FIG. 6.

Moreover, the first initialization steps also include setting the non-completed flags (step 709) as non-completed status, which can be 1 or 0, or a component of a mixed flag containing other flags.

After the first initialization steps, the thumb drive is sold to a user (step 711). When a user buys the thumb drive, the user connects the thumb drive to a computer or an electronic device like a camera (step 713). When the thumb drive is connected to a computer, the computer tries to access the file system table on the thumb drive and thus sends a read command to the thumb drive for a specific address. The thumb drive determines that the non-completed flag is still in non-completed status, but still reads the data from the memory module for the specific address. In addition, the data read are descrambled under normal procedure (step 715) before sending to the computer. Because the thumb drive is just card opened and no valid data are stored, yet. These data, after descrambled, are still random values that are not defined. The computer read these undefined values (step 717) and determines that the thumb drive not being formatted yet. Therefore, the computer requests a confirmation of the user before issuing a format command to the thumb drive perform second initialization operation (step 719).

After the thumb drive receives the format command (step 721), the thumb drive starts formatting process (step 723). In addition, the thumb drives sets the non-completed flag into completed status. Later, when the thumb drive receives a write command, the write data are scrambled before writing to the memory module. Besides, the thumb drive references the valid flags and determines whether to perform descrambling for read data under normal mode.

In the aforementioned embodiments, basic file system data structures like FAT16, FAT32, NTFS are not initialized in the storage apparatus like the thumb drive. In such case, normal operating systems will determine a storage apparatus not formatted yet when such storage apparatus is connected. Next, the operating systems inform a user and the user determines whether to format the storage apparatus. In the following embodiment, a different design is introduced.

Similar to the abovementioned embodiment, a manufacturer acquires a controller in integrated chip or circuit forms and memory modules like flash memory. Unlike the embodiment in FIG. 7, during card opening process, basic file system data structures are written to the thumb drive. The file system data structures refer to basic information for a normal operating system to access files, like FAT16, FAT32, NTFS, etc. Meanwhile, non-completed flags of other logical blocks are still set as non-completed status.

In such design, when a user buy one such thumb drive and connects it to a computer, an operating system thereon is able to access basic file system data structure. Therefore, the operating system does not request the thumb drive to be formatted. On the other hand, when next normal data write or read operation, the controller in the thumb drive finds the non-completed flags still in non-completed status, steps like step 725 and thereafter in FIG. 7 are executed.

In other words, in this embodiment, some non-completed flags in the thumb drive after card opening are still set non-completed status. Users are not aware of difference under normal file operations over an operating system because setting and processing non-completed flags are performed by the controller in the thumb drive. On the other hand, if a user runs a special program to access a specific address in a logical block of the thumb drive, the controller detects whether the non-completed flags in non-completed status. If the non-completed flag is in non-completed status, the controller may descramble an actual stored value that may be a random value and then return descrambled value. Specifically, the controller does not determine whether a corresponding physical block is new and then provide a predetermined value.

For normal flash memory modules, erase operation is equivalent to fill a predetermined value. Because the predetermined value is not scrambled when it is set, valid flags may be used for indicating whether the data are valid or a substantial invalid value.

Although the above descriptions take a thumb drive as an example, it is not limited to be applied to a thumb drive. For example, the computer 10 may be replaced as any electronic devices like a mobile phone, a tablet computer, a television, a camera or any electronic devices that need a storage device. The thumb drive may be replaced as other storage device external to the computer 10 or any other storage device internal to the computer 10. The USB transmission interface 102 may be replaced as any data transmission interface, like IEEE 1394, SATA, MS interface, MMC interface, SD interface, CF interface, IDE interface, PCT interface, etc.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A data storage apparatus, comprising:
a transmission interface;
a nonvolatile memory, wherein the nonvolatile memory is a flash memory comprising a plurality of physical blocks, the controller records a mapping relation for mapping a plurality of logical blocks to the plurality of physical blocks;
a controller for recording a non-completed flag;
wherein when the controller receives a first initialization command via the transmission interface, the controller performs a first initialization setting to the nonvolatile memory and sets the the non-completed flag as a non-completed status;
wherein when the controller receives a second initialization command via the transmission interface, the controller performs a second initialization setting to the nonvolatile memory and sets the non-completed flag as a completed status;
wherein when the controller receives a write command via the transmission interface, write data are scrambled and then the scrambled write data are written to the nonvolatile memory;
wherein when the non-completed flag indicates the non-completed status, if the controller receives a read command to the nonvolatile memory via the transmission interface, no matter whether data associated to an indicated address of the read command are scrambled, the controller descrambles the data associated to the indicated address and then provides the descrambled data associated to the indicated address via the transmission interface;
wherein the controller records whether the physical block associated with each logical block is valid according to a valid flag;
wherein only when the non-completed flag indicates the completed status, the controller determines whether to return the descrambled data according to the valid flag.

2. The data storage apparatus of claim 1, wherein the first initialization setting is a card open processing, and in the card open processing, the nonvolatile memory is not formatted.

3. The data storage apparatus of claim 1, wherein the second initialization setting is formatting and in the formatting, the controller formats the nonvolatile memory.

4. The data storage apparatus of claim 3, wherein when the data storage apparatus is connected to an external device, the external device tries to access data of at least one specific address of the data storage apparatus and find the data undefined, the external device issues the second initialization command.

5. The data storage apparatus of claim 3, wherein the card open processing is performed by a manufacturer of the data storage apparatus, and the formatting is performed when a user uses the data storage apparatus.

6. The data storage apparatus of claim 1, wherein the descrambling adjusts electronic characteristics corresponding to data stored in the nonvolatile memory to increase reliability of data storage.

7. The data storage of claim 1, wherein the nonvolatile memory comprises a control circuit and a plurality of flash memory physical blocks, and the control circuit erases the flash memory physical block to correspond to a initial value when receiving an erase command from the controller.

8. A method for managing a data storage apparatus, the data storage apparatus comprising a transmission interface, a nonvolatile memory and a controller, the method comprising:
the controller recording a non-completed flag;
the controller performing a first initialization setting to the nonvolatile memory and setting the non-completed flag as a non-completed status when the controller receiving a first initialization command via the transmission interface;
the controller performing a second initialization setting to the nonvolatile memory and setting the non-completed flag as a completed status when the controller receiving a second initialization command via the transmission interface; and
the controller scrambling write data before the scrambled write data being written to the nonvolatile memory when the controller receiving a write command via the transmission interface;
wherein when the non-completed flag indicates the non-completed status, if the controller receives a read command to the nonvolatile memory via the transmission interface, no matter whether data associated to an indicated address of the read command are scrambled, the controller descrambles the data associated to the indicated address and then provides the descrambled data associated to the indicated address via the transmission interface;
wherein the nonvolatile memory is a flash memory comprising a plurality of physical blocks, the controller records a mapping relation for mapping a plurality of logical blocks to the plurality of physical blocks;
wherein the controller records whether the physical block associated with each logical block is valid according to a valid flag;
wherein only when the non-completed flag indicates the completed status, the controller determines whether to return the descrambled data according to the valid flag.

9. The method for managing the data storage apparatus of claim 8, wherein the first initialization setting is a card open processing, and in the card open processing, the nonvolatile memory is not formatted.

10. The method for managing the data storage apparatus of claim 9, wherein the second initialization setting is formatting and in the formatting, the controller formats the nonvolatile memory.

11. The method for managing the data storage apparatus of claim 10, wherein when the data storage apparatus is connected to an external device, the external device tries to access data of at least one specific address of the data storage apparatus and find the data undefined, the external device issues the second initialization command.

12. The method for managing the data storage apparatus of claim 10, wherein the card open processing is performed by a manufacturer of the data storage apparatus, and the formatting is performed when a user uses the data storage apparatus.

13. The method for managing the data storage apparatus of claim 8, wherein the descrambling adjusts electronic characteristics corresponding to data stored in the nonvolatile memory to increase reliability of data storage.

14. The method for managing the data storage apparatus of claim 8, wherein the nonvolatile memory comprises a control circuit and a plurality of flash memory physical blocks, and the control circuit erases the flash memory physical block to correspond to a initial value when receiving an erase command from the controller.

15. The method of managing the data storage apparatus of claim 8, wherein during the first initialization setting, a file system data structure is set in the nonvolatile memory.

16. The method of managing the data storage apparatus of claim 15, wherein during the first initialization setting, the non-completed flags of logical blocks of the nonvolatile memory other than the block storing the file system data structure are set non-completed status.

17. A data storage apparatus, comprising:
a transmission interface;
a nonvolatile memory, wherein the nonvolatile memory is a flash memory comprising a plurality of physical blocks, the controller records a mapping relation for mapping a plurality of logical blocks to the plurality of physical blocks; and
a controller for recording a non-completed flag;
wherein when the non-completed flag indicates a non-completed status, if the controller receives a read command to the nonvolatile memory via the transmission interface, reads data according to an indicated address of the read command, the controller descrambles the data associated to the indicated address and then transmits the descrambled data associated to the indicated address via the transmission interface;
wherein the controller records whether the physical block associated with each logical block is valid according to a valid flag;
wherein only when the non-completed flag indicates the completed status, the controller determines whether to return the descrambled data according to the valid flag.

18. A method for managing a data storage apparatus, the data storage apparatus comprising a transmission interface, a nonvolatile memory and a controller, the method comprising:
the controller recording a non-completed flag;
the controller scrambling write data before the scrambled write data being written to the nonvolatile memory when the controller receiving a write command via the transmission interface;
wherein when the non-completed flag indicates the non-completed status, if the controller receives a read command to the nonvolatile memory via the transmission interface, no matter whether data associated to an indicated address of the read command are scrambled, the controller descrambles the data associated to the indicated address and then provides the descrambled data associated to the indicated address via the transmission interface;
wherein the nonvolatile memory is a flash memory comprising a plurality of physical blocks, the controller records a mapping relation for mapping a plurality of logical blocks to the plurality of physical blocks;
wherein the controller records whether the physical block associated with each logical block is valid according to a valid flag;
wherein only when the non-completed flag indicates the completed status, the controller determines whether to return the descrambled data according to the valid flag.

* * * * *